Nov. 6, 1951  C. G. LINDGREN  2,574,216
FISH REEL
Filed Nov. 5, 1948
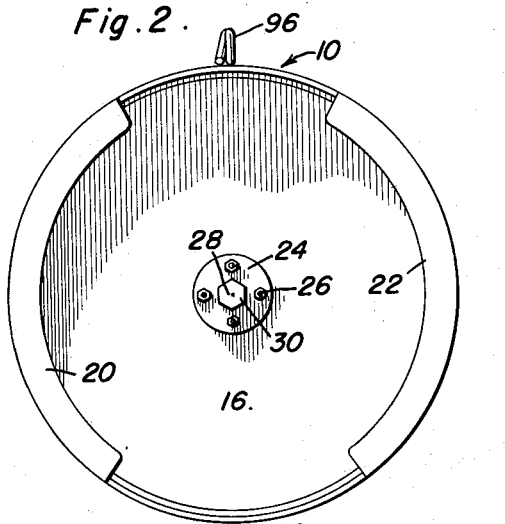
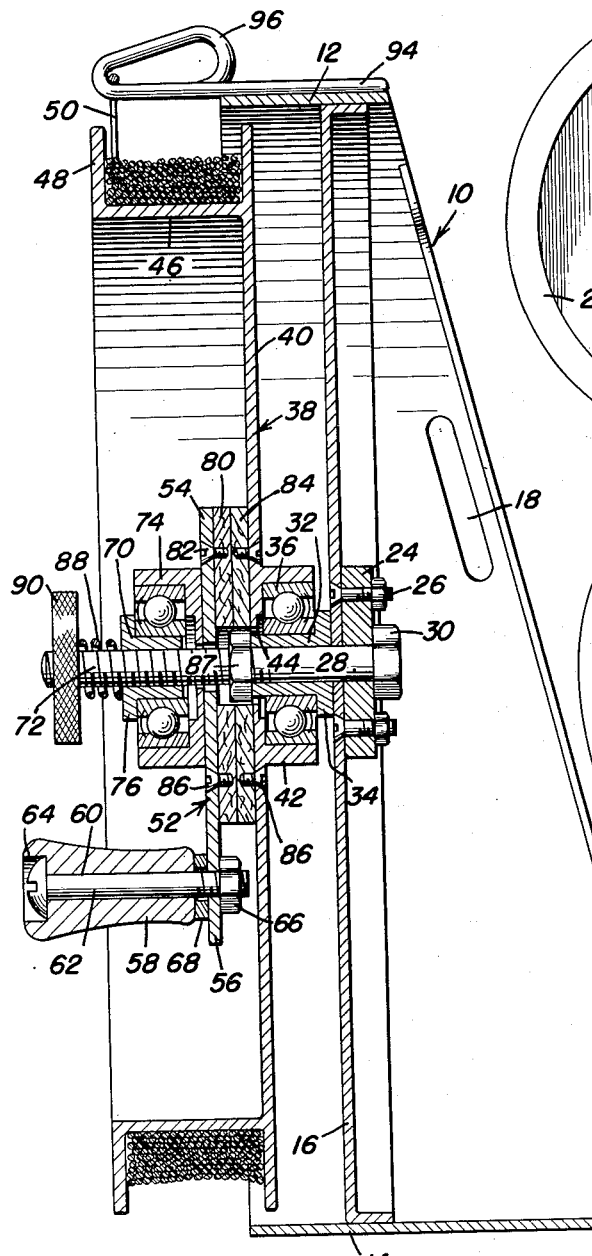
Fig. 1.
Fig. 2.
Fig. 3.
Inventor
Clarence G. Lindgren
By *Clarence A. O'Brien and Harvey B. Jacobson*
Attorneys Patented Nov. 6, 1951

2,574,216

UNITED STATES PATENT OFFICE 2,574,216

FISH REEL

Clarence G. Lindgren, Yakima, Wash.

Application November 5, 1948, Serial No. 58,385

4 Claims. (Cl. 242—106)

1

This invention relates to improvements in reel assemblies and structures in general and more particularly to novel advancements in a fishing reel that may be employed without a rod.

A primary object of the instant invention is to enable a fisherman to at all times have firm and complete control over the paying out of the fishing line of the reel assembly and the retrieving of the line and catch, with a minimum of friction and drag acting on the line. Thus, it is the purpose of this invention to provide what is commonly referred to as a belt reel inasmuch as the same is adapted to be supported by a belt worn around the waist of the user, the line carried by the reel being attached to a rod, so that the reel cannot interfere with the movement of the line and will lessen the weight on the rod, increasing the distance to be obtained while casting and eliminating backlash on casting.

It is another important object of this invention to provide a reel assembly including a line carrying spool rotatably mounted on a spindle associated with the assembly, an internal friction clutch being associated with the spool for controlling and braking the rotation thereof, the clutch being actuated by a finger tip control, so that any desired tension may be placed on the spool in conformity with fishing conditions, such as the size of the fish, current and the like.

Another important object of this invention is to provide a belt reel assembly, adapted for attachment to a belt worn around the waist of a user, the reel assembly including a spindle laterally extending from a casing, a spool rotatably mounted on said spindle, a handle assembly carried by said spindle, a friction clutch associated with said spool and handle assembly for selectively securing the same unitarily, responsive to a finger tip control, whereby the spool is manually rotated by the handle assembly and may be selectively braked and the rotation thereof controlled.

These and ancillary objects and structural features of merit, which will become more apparent upon a perusal of the following description, are attained by this invention, a preferred embodiment of which is set forth in the accompanying drawing, wherein:

Figure 1 is a view in perspective of a reel, constructed in accordance with the principles of this invention;

Figure 2 is a rear elevational view thereof;

Figure 3 is a vertical sectional view taken on line 3—3 of Figure 1.

Referring to the drawing, the reference character 10 generally designates the fishing reel or more particularly the belt reel, which includes a casing 12. The casing 12 includes an annular outer member 14 having a circular plate 16 secured therein. The annular casing extends rearwardly of the plate 16, with the side walls thereof slanted upwardly to conform to the contour of the body of the user, so that the casing is carried by a belt upon the body of the fisherman in an upwardly slanted or directed position. For attaching the casing to a belt or similar body engaging member, the same is provided with opposed slots or openings 18. The annular casing is provided at its rear end with lateral inwardly directed arcuately configured flanges 20 and 22, which may be suitably padded.

A bracing or strengthening disc or plate 24 is secured to the center of the plate 16, preferably to the rear surface or face thereof, by fastening means 26. A spindle 28 is secured through the strengthening disc or plate by means of a locking nut 30, disposed on the inner end thereof. A bushing 32 is concentrically disposed on the axle portion of said spindle 28 and is provided with an annular flange 34 at one end adapted to abut against the outer face of the plate 16. A ball bearing assembly 36 is concentrically disposed on the sleeve-like bushing 32 and engaged against the outer surface of the flange 34. A spool 38 is rotatably mounted on the bearing assembly 36, the spool including a circular plate 40 having a laterally extending annular hub 42 disposed on the ball bearing assembly. The plate 40 is provided with a centrally disposed opening 44 adapted to engage on the bushing 32 and bear against the outer side wall of the bearing assembly. An annular flange 46 integrally extends outwardly from the plate 44, being spaced inwardly from the circumferential periphery of the plate and is provided at its outer end with an integral annular upstanding wall 48, disposed complementary to and extending laterally with the perimeter of the plate 40. Thus, the perimeter of the plate 40 and the flange 48 with the annular flange 46 define the spool member 38, with the fishing line 50 coiled thereon.

A handle assembly 52 is disposed on the shaft or spindle 28 and includes a centrally apertured plate 54 having an extended end 56. A knob 58 is axially bored as at 60 to accommodate a longitudinally positioned bolt or clamping member 62, having its head countersunk in a recess 64 formed in the outer end of the knob. The bolt 62 secures the knob to the end 56 of the disc by means of a clamping nut 66, a spacing bushing or washer 68 being provided and disposed on the bolt to space the inner end of the knob from the end 56 of the disc. A sleeve-like or cylindrical bushing 70 is concentrically disposed on the threaded end or shank 72 of the axle 28 and a ball bearing race assembly 74 is concentrically disposed thereon between the outer surface of the disc 54 and the annular flange 76 formed on the outer end of the bushing.

Means is provided for braking the rotation of the spool, rotatably mounted on the axle 28 and for controlling the rotation thereof, during the paying out of the line 50 and also for securely associating the handle assembly 52 with the spool, so that the spool may be manually rotated to retrieve the line. Any suitable friction clutch may be provided and may, by way of example, include a friction disc 80 secured by countersunk screws 82 to the inner surface of the disc 54 and a complementary similarly formed friction or braking disc 84 secured in a similar manner by screws or the like 86 to the outer surface of the plate 40. Thus, the complementary friction discs 80 and 84 are disposed in juxtaposition on the axle 28 and are carried respectively by the handle disc 54 and the plate 40 of the spool 38. Of course, the axle 28 is securely locked against rotation by means of the locking nut 30 secured on the inner end thereof and a cooperating locking nut 87 centrally disposed thereon and engaging against the outer end of the bushing 32.

Means is provided for easily and conveniently exerting a pressure on the disc 54 to force the friction discs 80 and 84 into contact and secure engagement and includes a spring 88 disposed on the outer end of the axle 28 and bearing against the annular flange 76 on the bushing 70 to exert a pressure on the disc. A knurled wheel 90 is adjustably threaded on the threaded end 72 of the axle and bears against the outer end of said coil spring, so that the friction discs 80 and 84 may be moved into contact responsive to a finger tip control means.

A line guiding member 94 is laterally carried by the upper portion of the casing and extends over the spool 38. The member 94 includes a single or continuous piece of wire or the like secured at one end to the casing and bent at its outer end to form an eye or opening 96 overlying the spool and adapted to receive the line 50.

In operation, the reel will be supported by the body of a user by securing the same on a belt worn by the fisherman. The line may then be secured to a rod or used without a rod dependent upon the desire of the fisherman and type of fishing he is engaged in. In any respect, it can be seen that the spool will rotate to play out the line until the knurled thumb wheel or knob 90 is rotated moving the friction discs 80 and 84 into contact. Then, the handle may be employed to retrieve the line by rotating the spool and winding the same thereon.

Thus, it can be seen that there is provided an improved belt reel that will be supported and carried by the body of the fisherman to permit greater freedom in casting, trolling and the like and which is provided with a friction clutch responsive to a convenient and fast finger tip control for controlling the rotation of the spool and enabling the line to be retrieved.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

1. A reel assembly comprising a casing having means whereby the same may be attached to a user's belt, a centrally disposed spindle attached to and projecting from a portion of said casing, a reel mounted freely for rotation on said spindle and operating in said casing, a first brake disk fixed to the central portion of said reel and encircling said spindle, a bearing retainer encircling said spindle and having a lateral annular flange, an outer ball bearing race fitting in said retainer within the encompassing limits of said flange, a sleeve adjustably encircling said spindle, said sleeve having a peripheral flange thereon, an inner ball bearing race surrounding said sleeve and in concentric spaced relation within the inner peripheral limits of said first named race, ball bearings interposed between the respective races, a second brake disk opposed to and contacting said first named brake disk and encircling said spindle, said second named brake disk being located between said bearing retainer and said first named brake means and being provided with handle means, and manually regulable adjustable means adjustably mounted on said spindle and serving to exert axial pressure against said sleeve, races, bearing retainer and second named brake disk.

2. The structure defined in claim 1 wherein said adjusting means embodies a coil spring surrounding the spindle and bearing at one end against the flange on said sleeve.

3. The structure defined in claim 2 wherein adjusting means also includes a knurled wheel threadedly mounted on said spindle and bearing against said coil spring.

4. The combination of claim 3 wherein said casing includes a plate, said plate having an axial bore therein, a reinforcing collar secured to the rear side of said plate axially of said bore, said spindle extending through said reinforcing collar and said bore, a reel supporting collar on said spindle, means detachably securing said reel supporting collar and said spindle to said plate, and antifriction bearing means on said collar and supporting said reel.

CLARENCE G. LINDGREN.

REFERENCES CITED

The following references are of record in the file of this patent:

UNITED STATES PATENTS

| Number | Name | Date |
|--------|------|------|
| 821,699 | Broomall | May 29, 1906 |
| 1,097,430 | Heckman | May 19, 1914 |
| 1,358,049 | Atwood | Nov. 9, 1920 |
| 1,452,603 | Himes | Apr. 24, 1923 |
| 1,517,060 | Hanson | Nov. 25, 1924 |
| 2,428,324 | Worden | Sept. 30, 1947 |
| 2,454,590 | Berlinger | Nov. 23, 1948 |
| 2,471,723 | Cannon | May 31, 1949 |

FOREIGN PATENTS

| Number | Country | Date |
|--------|---------|------|
| 1,631 of 1907 | Great Britain | Jan. 22, 1908 |
| 155,627 | Germany | Aug. 30, 1903 |
| 389,694 | Great Britain | Mar. 23, 1933 |